United States Patent [19]

Albano

[11] 3,936,590
[45] Feb. 3, 1976

[54] SEAL RING AND SPLICE ENCLOSURE
[76] Inventor: Philip A. Albano, 10311 Tanager Trail, Brecksville, Ohio 44141
[22] Filed: Dec. 9, 1974
[21] Appl. No.: 530,955

[52] U.S. Cl.................. 174/92; 174/77 R; 277/227
[51] Int. Cl.² ........................................ H02G 15/08
[58] Field of Search ............ 174/65 G, 77 R, 91–93; 277/165, 229, 227

[56] References Cited
UNITED STATES PATENTS
3,796,823  3/1974  Wright et al. .......................... 173/92

Primary Examiner—Darrell L. Clay
Attorney, Agent, or Firm—Joseph Januszkiewicz

[57] ABSTRACT

An annular deformable sealing ring that is split, having a deformable tape that extends around the outer circumference, the inner circumference and the split portion. The ring surrounds an electrical cable to seal it in a housing.

6 Claims, 4 Drawing Figures

SEAL RING AND SPLICE ENCLOSURE

BACKGROUND OF THE INVENTION

This invention relates to a splice ring assembly or case and more particularly to a new and improved deformable splicing ring, its cooperative tape and its encasing member or case for weather-proofing the splicing joint of a pair of aligned electrical cables.

In the splicing of an electrical cable which may be made up of a plurality of individually insulated wires, it has been necessary to initially splice the separate individual pairs of opposing wires and thereafter wrap the respective ends of the aligned cables close to the splice with a deformable tape a sufficient number of turns until a sufficient amount of tape encompasses the respective ends of the spliced cables to completely fill the respective end portions of an encompassing case to seal the case from moisture. Such wrapping involves many numerous wounds about the circumference of the cables. In such sealing process, the buildup of tape is such that the case which is composed of a pair of sections will squeeze the tape causing the tape to be deformed. Such buildup of tape, if containing an insufficient amount of tape, will permit moisture to penetrate the case. In the event more tape is wound than necessary, it will either deform the cable or interfere with the closing of the case, or, if closed, will leave clearance space along the juncture of the case. The retention of pressure on the tape over a period of time will cause the tape to deteriorate and make it extremely difficult to separate the case from the insulation and particularly difficult to remove the old tape from the cable since the tape attaches itself securely to the other portions of the tape wound adjacent thereto. In order to separate the split casing from the wound tape, it is often necessary to apply a torch to soften the tape. Where such a casing is underground, for safety reasons it is prohibitive to use a torch or open flame due to the danger of accumulation of gases and thus makes it extremely difficult to expeditiously separate the casing from the spliced cables.

The present invention provides for a novel means including a deformable sealing ring that cooperates with a layer of deformable tape which cooperatively encompass the cable adjacent to the splice joint to effectively seal and waterproof the joint when sealed in a splice case. Such tape is deformable to conform to the profile of the cable, which may be out of round. Such spliced joint with pairs of cable and their sealing rings are placed into a split case or housing to effectively seal such cable from exterior elements. Such structure permits the rapid disassembly, inspection of splice joint, its corresponding inspection and reassembly. The sealing ring is available in a variety of sizes to accommodate different sizes of cables in combination with the case to facilitate such quick assembly and disassembly. In addition, such sealing ring may accommodate a plurality of conduits in which case the sealing ring would have a plurality of bores with each bore being connected to the outer surface of the ring by a split to accommodate a layer of deformable tape which also encompass the conduit or line in the bore.

SUMMARY OF THE INVENTION

An electrical annular deformable sealing ring that is split to accommodate the wrapping of a single layer of deformable tape about the entire outer and inner circumference and through the split portion of such ring such that each one of such rings encompass the respective ends of a cable closely adjacent to the spliced juncture of the cables. A split casing with reduced end portions encompasses the spliced joint with the respective reduced end positions snugly receiving the respective deformable sealing rings with the deformable tape. Such sealing ring may have a plurality of bores to accommodate one or more cables for splicing such that each bore in the sealing ring is split to the outer circumferentially extending surface to accommodate a layer of tape and the cable to be snugly held thereby.

BRIEF DESCRIPTION OF THE INVENTION

DETAILED DESCRIPTION

Figure 1:
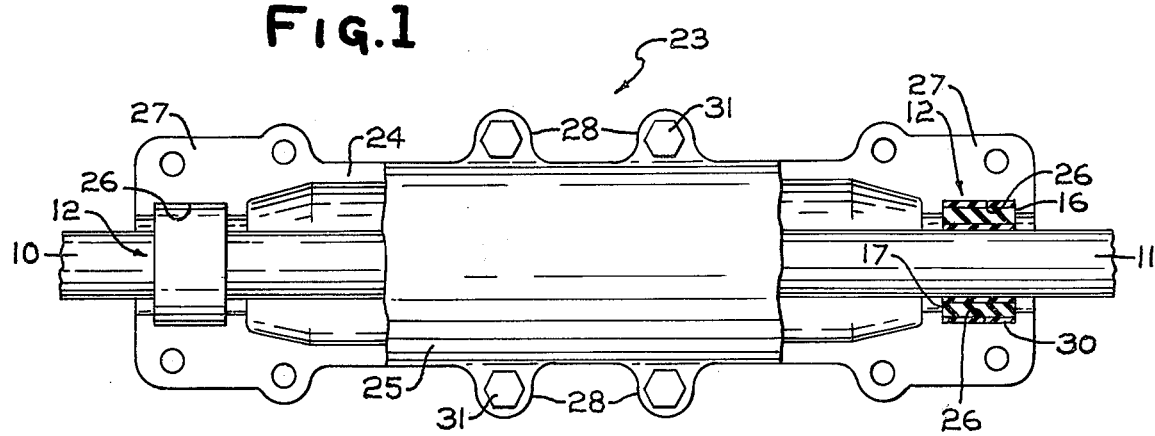
FIG. 1 is a fragmentary cross-sectional view taken of a splice case assembly including a pair of sealing rings supporting a pair of aligned electrical cables with only a portion of the wires shown and the spliced portion being in the central part of the splice case.

Referring to the drawings wherein like reference characters designate like or corresponding parts throughout the several views, there is shown in FIG. 1 a pair of aligned cables 10 and 11 wherein each cable 10 and 11 contain a plurality of insulated electrical lines or conductors, which lines are suitably spliced together in a manner old and well known in the art. The splice is hid by a case to be described. The respective ends adjacent to the splice portion or junction is supported by a deformable sealing ring 12.

Figure 2:
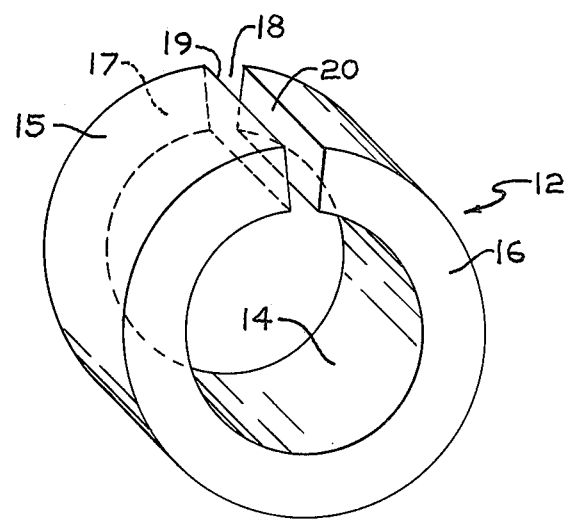
FIG. 2 is a perspective view of the split sealing ring with the split portion separated for clarity of parts.
Figure 3:
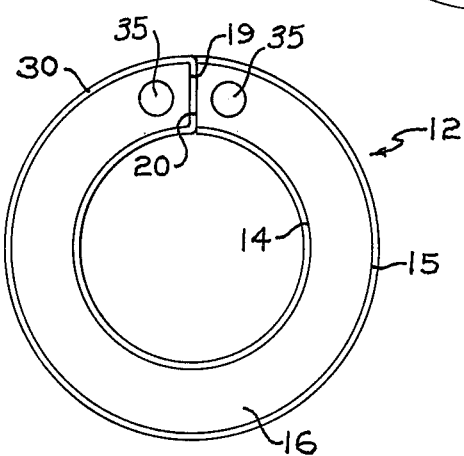
FIG. 3 is a front elevational view of the split deformable sealing ring and deformable tape thereon.

Deformable sealing ring 12 is an annular member made as from rubber, having an inner circumferentially extending surface 14 and an outer circumferentially extending surface 15. The side surfaces of the ring 12 between the outer and inner circumferentially extending surfaces provide a pair of spaced annular surfaces 16 and 17. The sealing ring 12 is slit to provide an interstice or gap 18, presenting a pair of spaced end faces 19 and 20 which, as shown in FIG. 2 are separated from each other in exaggerated relationship since such sealing ring in the normal condition has the respective faces 19 and 20 in abutting relationship. The sealing ring 12 may have a pair of spaced holes 35 on the annular surface 16 (shown in full outline in FIG. 3) closely adjacent to the faces 19 and 20. Such holes 35 would extend from the surface 16 into the body of the sealing ring 12 whereby suitable pliers with pointed ends could be employed to engage the holes 35 so that upon squeezing of the handles thereof, the end faces 19 and 20 separate to facilitate the placing of a deformable tape 30 around the entire outer circumference of the ring 12, then across one face 19 and thence around the entire inner circumferentially extending inner surface 14. The sealing ring 12 with deformable tape 30 is placed over the one cable adjacent to the spliced joint while a second sealing ring 12 with tape 30 is placed on the other cable closely adjacent to the splice joint. With such sealing rings over the respective cables, such splice joint is in condition for splicing and placing in a case or housing 23.

Case 23 is comprised of a pair of sectional members or sections 24-25 which are adapted to encompass the sealing ring 12 to form a splice ringe assembly. Such case 23 is generally cylindrical in shape, having a cylindrical recess 26 at each end to receive the sealing ring 12 and its conduit or electrical line. Each split member of the case has flanged portions 27 at the respective end portions thereof and flanged portions 28 on the intermediate portion. Such flanged portions have threaded bores 29 therethrough so that upon mating the respective pairs of members, screw 31 through the bores 29 joint the pair of split members into a single housing or case to encase the spliced cables. The respective deformable sealing rings with the deformable tape 30 thereon is received by the respective reduced cylindrical recesses 26 of the splice case 23. With the respective end portions of the case 23 encompassing the aligned cables and rings, screws 31 through bores 28 secure the respective end portions of the cable to complete the assembly thereof.

Figure 4:
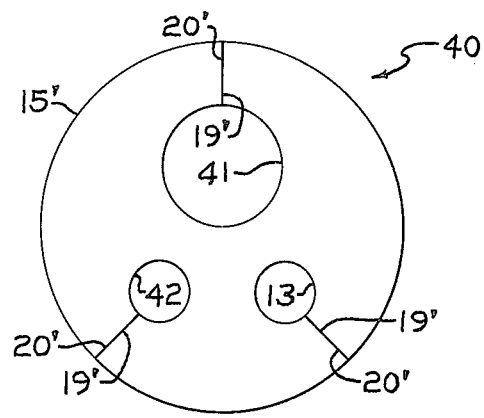
FIG. 4 is a modification of the sealing ring shown in FIG. 2 wherein the sealing ring is a cylindrical member with a plurality of bores extending therethrough with such ring having splits extending from the outer circumferentially extending surface to each bore.

A modification of the sealing ring is shown in FIG. 4 wherein a cylindrical deformable ring 40 has a plurality of through bores 41, 42 and 43. Such bores may vary in size depending on the size of cable or electrical line they are to receive. As an example, where two lines are being spliced and two branch cables are to be led off from such splice, it would require one large bore 41 and two smaller bores 42 and 43. The thickness of such ring 40 could approximate that of sealing ring 12 such as to snugly fit the case 21, which case 21 similarly may vary in size as is well known in the art. The sealing ring 40 has a plurality of slits extending from the outer circumferentially extending surface 15' to the respective bores 41 through 43 providing end faces 19' and 20' similar to the first described embodiment. The sealing ring 40 receives the deformable tape 30 along the inner circumferentially extending surface of the respective bores, along the end faces and along the outer circumferentially extending surface 15' in the same manner as the first embodiment to facilitate the reception of the spliced cables in the case 23 as well as its removal therefrom.

Other modifications are contemplated and may obviously be resorted to by those skilled in the art without departing from the described invention, as hereinafter defined by the appended claims, as only a preferred embodiment thereof has been disclosed.

I claim:

1. An electrical seal ring comprising an annular deformable member; said member having an inner circumferentially extending surface and an outer circumferentially extending surface; said member having a slit that extends from said inner circumferentially extending surface to said outer circumferentially extending surface to provide a pair of spaced end faces adapted to abuttingly engage each other to form a closed annular ring; and deformable tape means encircling said annular member by extending along said entire outer circumferential surface, said entire inner circumferential surface, and at least one of said end faces.

2. An electrical seal ring as set forth in claim 1 wherein said deformable tape means is a single layer.

3. An electrical seal ring as set forth in claim 2 wherein said member has a pair of spaced annular surfaces whose outer edges are co-extensive with said circumferentially extending surface; said member having a pair of spaced bores extending from one of said annular surfaces inwardly into said member; and the centerline of said bore being parallel to the axis of said outer circumferentially extending surface.

4. An electrical seal ring as set forth in claim 3 wherein said deformable member is made of elastomeric material.

5. An electrical seal ring as set forth in claim 4 wherein a split casing member has its one end encompassing said seal ring and said split casing is split in a longitudinal direction into a pair of sections.

6. A seal ring assembly comprising a housing, said housing being split longitudinally into a pair of sections; means for securing said sections into abutting engagement; said housing having an enlarged hollow central portion and spaced reduced end portions for receiving cables therethrough; the said reduced end portions having a smooth cylindrical inner surface with shoulders at its respective edges, a circular seal ring located in each of said end portions; each of said seal rings being a deformable member having an inner circumferentially extending surface and an outer circumferentially extending surface; said deformable member abuttingly engaging said shoulders, each of said members having a pair of spaced annular surfaces; each of said members having an interstice to provide a pair of spaced end faces adapted to abuttingly engage each other to form a closed annular ring; and deformable tape means encircling each of said splice rings by extending along the entire outer circumferential surface, along at least one of said end faces and along said entire inner circumferential surface for contacting a cable passing therethrough.

* * * * *